United States Patent

[11] 3,592,335

| [72] | Inventor | Howard M. Meyer |
| | | Ypsilanti, Mich. |
| [21] | Appl. No. | 879,839 |
| [22] | Filed | Nov. 25, 1969 |
| [45] | Patented | July 13, 1971 |
| [73] | Assignee | General Motors Corporation |
| | | Detroit, Mich. |

[54] CONVEY FOR CYLINDRICAL PARTS
3 Claims, 4 Drawing Figs.

| [52] | U.S. Cl. | 198/219 |
| [51] | Int. Cl. | B65g 25/04 |
| [50] | Field of Search | 198/218, 219 |

[56] References Cited
UNITED STATES PATENTS

| 3,500,992 | 3/1970 | Tabor | 198/219 |

Primary Examiner—Edward A. Sroka
Attorneys—J. L. Carpenter and E. J. Biskup

ABSTRACT: A conveyor for moving individual cylindrical members along an axis substantially perpendicular to the longitudinal axis of the parts. The conveyor includes a pair of parallel baseplates having a series of axially spaced notches for supporting the cylindrical parts. A series of carrier members are supported between the baseplates and have a first portion located below one of the notches and a second portion extending into an axially adjacent notch. A drive member is provided for raising the carrier member so that the first portion will move a cylindrical part to an axially adjacent notch when the latter is unoccupied. When the axially adjacent notch supports a cylindrical part, the latter actuates the second portion of the carrier member thereby causing disengagement between the drive member and the carrier member to prevent raising of the first portion.

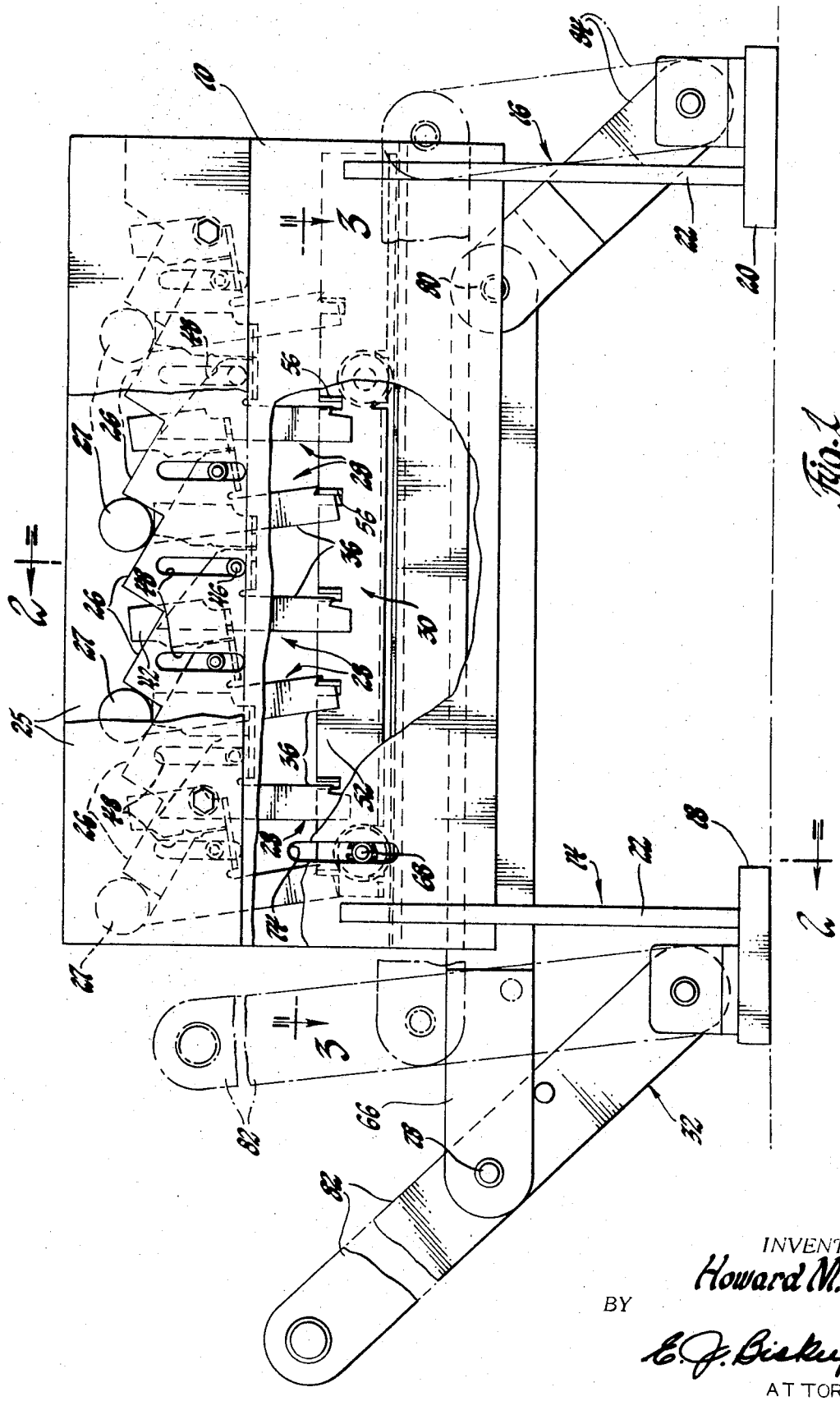

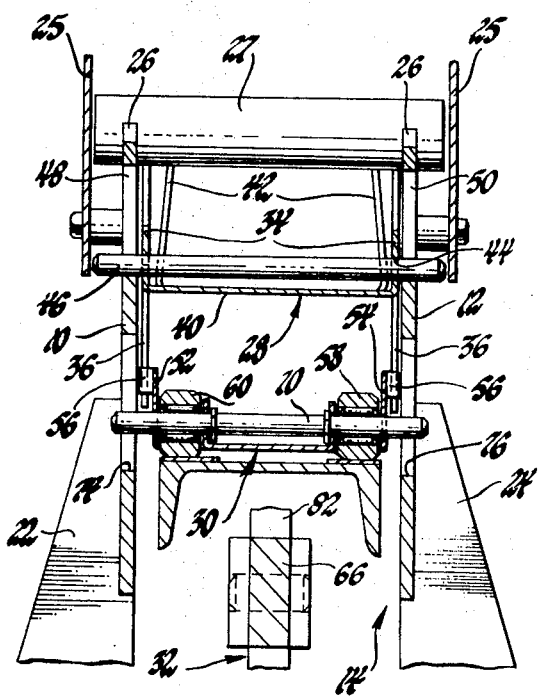
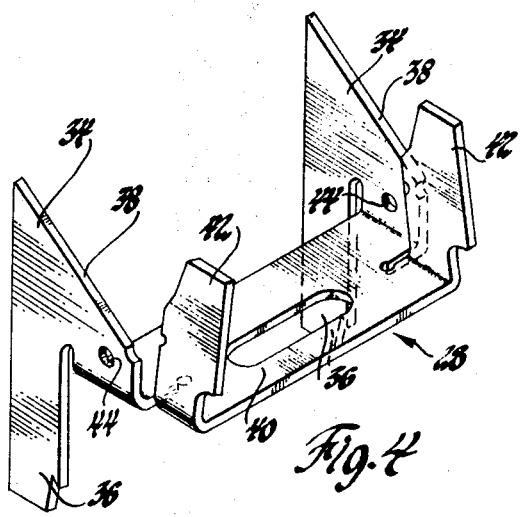
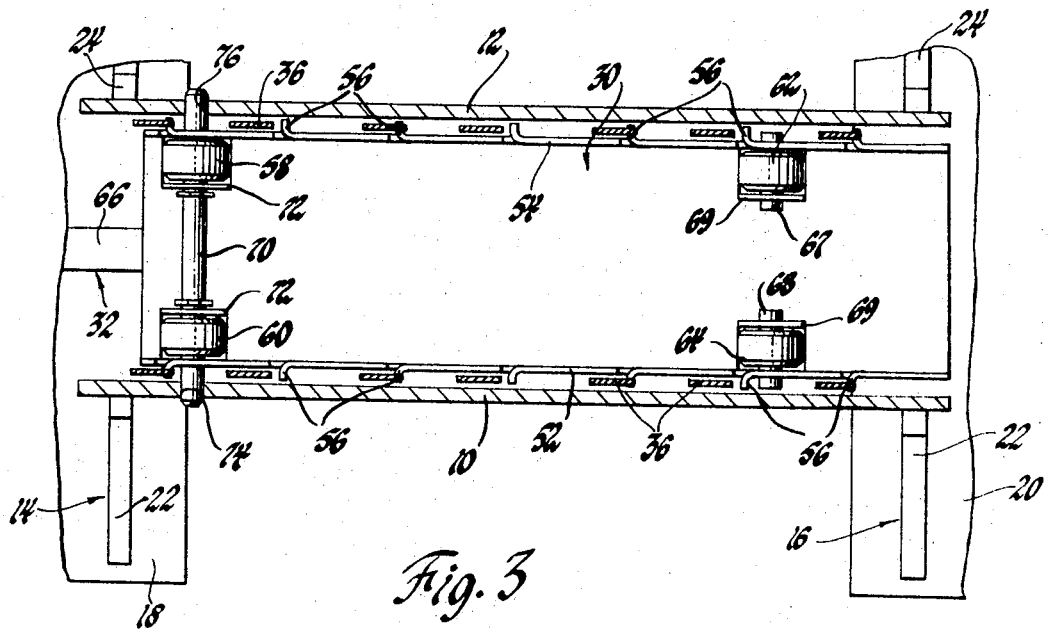

CONVEY FOR CYLINDRICAL PARTS

The manufacture of various types of products requires the forming or machining of cylindrical-shaped parts having a length-to-diameter ratio greater than one. These parts can be either solid or tubular and often have irregular outer surfaces in the form of splines, knurls, or stepped diameters. As is well known, one characteristic of cylindrical parts, particularly when they are formed with irregular outer surfaces is that they will not roll freely in a straight direction down an inclined chute unless the chute is kept full and rolling is intermittent and limited to an approximate distance of one part diameter per cycle. Even under such conditions, however, one encounters the problem of part-to-part contact which may mar or damage the finish of a close tolerance surface. The same is also true in the case of a continuously movable conveyor which has the additional drawback of creating a rubbing action between the parts that have accumulated at the end of the conveyor and are awaiting removal or automatic loading for a subsequent operation in a manufacturing process.

The present invention contemplates a conveyor system which alleviates some of the heretofore problems in transporting long cylindrical parts along an axis substantially perpendicular to the longitudinal axis of the parts. This is done by providing a conveyor which moves each cylindrical part individually so that no part-to-part contact occurs and also permits the parts to automatically accumulate when there is no room ahead so there is no movement or rubbing action of the part when it is stationary and awaiting transfer to another location. More specifically, the invention in the preferred form contemplates a conveyor which comprises a pair of laterally spaced sideplates, the upper portions of which are formed with a series of uniformly and axially spaced notches. Each pair of laterally spaced notches is adapted to support an individual cylindrical part along an axis extending transversely to the longitudinal axis of the sideplate. The conveyor also includes a plurality of carrier members, each of which is supported for pivotal and vertical sliding movement between each pair of axially spaced notches and comprises a ramp portion normally positioned below one of the axially spaced notches and a release member normally positioned with its top surface extending into the adjacent notch. An operating mechanism including a drive member is positioned below the carrier members and is adapted to raise each carrier member and thereby cause the ramp portion thereof to move a cylindrical part to the next set of laterally spaced notches assuming the latter are not occupied by another cylindrical part. Assuming the latter is the case, the release member assumes a depressed position and serves to disengage the operating mechanism from the carrier member so the former is incapable of raising the latter.

The object of the present invention are to provide a conveyor which will move individual cylindrical parts along an axis substantially perpendicular to the longitudinal axis of the parts; to provide a conveyor having a series of axially spaced notches formed in the top portion of a pair of parallel plates and includes an operating mechanism between the plates for moving the cylindrical members to the adjacent set of notches unless the latter is occupied by a cylindrical part; to provide a conveyor system for cylindrical parts which serves to space the parts during movement so as to prevent any part-to-part contact and provides continuous movement of the parts between axially spaced notches unless the next adjacent notch is occupied by a cylindrical part; to provide a feeder-type device having a series of notches for supporting cylindrical members and provided with carrier members which will successively move the cylindrical parts along an axis substantially perpendicular to the longitudinal axis of the parts without causing rubbing contact between the parts; and to provide a material-handling device which serves to axially space cylindrical members with their longitudinal axes located parallel to each other and includes an operating mechanism which serves to raise the cylindrical parts from a set of support notches to an adjacent set of support notches only when the latter is not occupied by a cylindrical part.

Other objects and advantages of the present invention will be derived from the following detailed description when taken with the drawings in which:

FIG. 1 shows an elevational side view of a conveyor made in accordance with the invention;

FIG. 2 is a cross-sectional view taken on line 2–2 of FIG. 1;

FIG. 3 is a cross-sectional plan view taken on line 3–3 of FIG. 1, and

FIG. 4 is an isometric view showing one of the carrier members incorporated with the invention shown in FIGS. 1 through 3.

Referring to the drawings and more specifically FIG. 1 thereof, a material-handling conveyor device is shown generally comprising a pair of parallel upstanding sideplates 10 and 12 which, as seen in FIG. 2, are laterally spaced and supported at the lower ends thereof by axially spaced stanchions 14 and 16 fixed to bases 18 and 20, respectively. Each stanchion 14 and 16 includes a pair of upright struts 22 and 24 rigidly connected to the sideplates 10 and 12, respectively. The upper portion of each of the sideplates 10 and 12 carries a guide plate 25 and is formed with a series of identical V-shaped notches 26 uniformly spaced along the longitudinal axis of the sideplate. Each set of laterally spaced notches 26 formed in the sideplates is adapted to support one of plurality of cylindrical parts 27 with the longitudinal axis thereof extending substantially normal to the longitudinal axis of the sideplates 10 and 12. A drive assembly including a plurality of identical carrier members 28, a lifter member 30 and an operating mechanism 32 are located between the sideplates 10 and 12 for causing the cylindrical parts 27 to be moved successively in the direction of the arrow.

More specifically, it will be noted that, as seen in FIG. 4, each carrier member 28 is a sheet metal stamping comprising a pair of laterally spaced and identical ramp portions 34 which are integrally connected with downwardly depending pawls 36. Both of the ramp portions have an inclined edge 38 and are interconnected by a transversely extending base section 40 which carries a pair of upwardly extending and laterally spaced release members 42 which are offset slightly inwardly of the ramp portions 34. Each carrier member 28 is also provided with a pair of axially aligned apertures 44 which accommodate a pin 46 as seen in FIG. 2. The opposite ends of the pin 46 extend through vertical slots 48 and 50 formed in the sideplates 10 and 12. It will be noted that, as seen in FIG. 1, a series of such slots are provided in the baseplates and located between each pair of axially spaced notches 26 for supporting the pins 46 of the carrier members 28. As should be apparent, each set of opposed slots 48 and 50 permit the carrier member 28 to be moved as a unit vertically as well as to be pivoted about the pin 46.

The lifter member 30 is also a sheet metal stamping of generally U-shape in cross section and includes a pair of upwardly extending outer arms 52 and 54, each of which is provided with a series of uniformly spaced outwardly projecting tabs 56 as seen in FIGS. 2 and 3. The number of tabs 56 formed on each arm of the lifter member 30 corresponds to the number of carrier members 28 incorporated with the device and are located in predetermined positions relative to the notches 26 formed in the sideplates 10 and 12 so as to assure that each tab 56 will engage the pawl 36 of a carrier member 28 under certain conditions and be disengaged from the pawl 36 under other conditions as will be described hereinafter.

The opposite ends of the lifter member 30 rotatably carry rollers 58, 60, 62 and 64 which rest on a horizontal drive bar 66. The rollers 62 and 64 are supported by stub shafts 67 and 68 held between the legs 69 and the associated arm, while rollers 58 and 60 are supported for rotation by a transverse shaft 70, the opposite ends of which extend through the arms 52 and 54 and through upwardly bent legs 72 and are located within vertical slots 74 and 76 formed in the sideplates 10 and 12, respectively. The slots 74 and 76 assure that the lifter member 30 moves in a vertical position when it is raised by the drive bar 66 in a manner now to be described.

As seen in FIG. 1, the drive bar 66 is pivotally connected at its opposite ends by pins 78 and 80 to a pair of lever members 82 and 84, respectively. The lever members 82 and 84 are respectively pivotally connected at their lower ends to the bases 18 and 20 which also support the stanchions 14 and 16. Thus, a parallelogram linkage is provided so by rotating the lever member 82 in a clockwise direction about its pivotal support with the base 18, the drive bar 66 is moved upwardly and inasmuch as it serves as a support for the rollers 58, 60, 62 and 64 on the lifter member 30, it causes the latter to be raised vertically as guided by the slots 74 and 76 formed in the sideplates 10 and 12. Although not shown, the lever member 82 is intended to be driven between the full line and the phantom line position through a suitable drive means (not shown) permitting the lever member 82 to cycle back and forth between the two positions.

The operation of the conveyor described above is as follows: Assuming all of the notches 26 formed in the sideplates 10 and 12 are occupied by a cylindrical part 27, all of the carrier members 28 will have the pawl portion 36 located to the left of the associated tabs 56 and out of the path of vertical movement of the tabs 56 as seen in FIG. 1 of the drawings. Under such conditions, cycling of the lever member 82 causes the lifter member 30 to be raised intermittently; however, inasmuch as no part of any of the pawl portions 36 is located in vertical alignment with the tabs 56, no movement of the carrier members 28 occurs. If, however, none of the notches 26 are supporting a cylindrical part, each carrier member 28, because of its design, automatically rotates in a counterclockwise direction about the pivot pin 46 to position a part of the pawl portions 36 above the tabs 56. As a result, upward movement of the lifter member 30 causes the tabs 56 to engage the pawl portions 36 and the carrier members 28 are raised vertically upwardly under the guidance of slots 48 and 50. If a cylindrical part 27 should now be placed in the first notch 26 from the left end of the conveyor as seen in FIG. 1, as the drive bar 66 raises the lifter member 30, the ramp portion 34 of the first carrier member 28 will cause the cylindrical par 27 to be raised and cammed forwardly along the edge 38 to the next adjacent notch 26. When the cylindrical part 27 moves into the adjacent notch 26, it will depress the release member 42 of the first carrier member 28 causing the latter to pivot in a clockwise direction so as to disengage the associated pawl portion 36 from the first tab member 56. Thereafter, upward movement of the lifter member 30 has no effect on the first carrier member 28, however, the second carrier member 28 will then be raised causing the cylindrical part 27 to be moved from the second notch to the succeeding third notch simultaneously depressing the release member of the second carrier member and causing the latter to pivot about its support pin 46 in a clockwise direction to disengage the associated pawl portion from the tab 56 below. Such movement of the cylindrical part continues until it reaches the last notch 26 formed in the sideplates 10 and 12. At that time, the last carrier member 28 will be disabled and be ineffective to raise any cylindrical part which may be placed in the notch behind the cylindrical part.

With the above operation in mind, it will be noted that with the cylindrical parts 27 positioned as shown in FIG. 1 in full and phantom lines, all four of the cylindrical parts 27 will be moved simultaneously to the next adjacent notch upon raising of the lifter member 30 because the release members 42 in the next adjacent notch are not depressed. Thereafter, the parts will continue moving to the right until they occupy adjacent notches.

Various changes and modifications can be made in this construction without departing from the spirit of the invention. Such changes and modifications are contemplated by the inventor and he does not wish to be limited except by the scope of the appended claims.

I claim:

1. A conveyor for moving individual cylindrical parts in a direction substantially perpendicular to the longitudinal axes of said parts, said conveyor comprising a pair of laterally spaced sideplates, a series of notches formed in the upper portion of each of said sideplates for supporting and axially spacing said individual cylindrical parts, a plurality of carrier members, each of said carrier members supported for pivotal and vertical sliding movement between a pair of axially spaced notches and comprising a ramp portion normally positioned below one of said pair of axially spaced notches and a release member having a normal position with its top surface extending into said other of said axially spaced notches to permit a cylindrical part to contact and depress said release member when said cylindrical part occupies the notch, a lifter member supported for vertical movement below said carrier members, cooperating means formed on said lifter member and each of said carrier members which permit the ramp portion of the latter to be raised to move a cylindrical part to the adjacent notch in response to upward movement of the lifter member when the release member of said each of said carrier members is located in said normal position, said cooperating means adapted to be disengaged when a cylindrical part depresses the release member so that upward movement of the lifter member is ineffective to raise the ramp portion.

2. A conveyor for moving individual cylindrical parts in a direction substantially perpendicular to the longitudinal axes of said parts, said conveyor comprising a pair of laterally spaced sideplates, a series of axially spaced notches formed in the upper portion of each of said sideplates for supporting said individual cylindrical parts, a plurality of carrier members, each of said carrier members supported for pivotal and vertical sliding movement by said sideplates at points located between a pair of axially spaced notches and comprising a ramp portion normally positioned below one of said pair of axially spaced notches and a release member having a normal position with its top surface above the lowest point of the other of said axially spaced notches, a lifter member supported for vertical movement below said carrier members, cooperating means formed on said lifter member and each of said carrier members which permit the ramp portion of the latter to be raised to move a cylindrical part to the adjacent notch in response to upward movement of the lifter member when the release member in said adjacent notch is located in said normal position, said cooperating means adapted to be disengaged when a cylindrical part is in said adjacent notch and depresses the release member to cause pivotal movement of said each of said carrier members whereby upward movement of the lifter member is ineffective to raise the ramp portion.

3. A conveyor for moving individual cylindrical parts in a direction substantially perpendicular to the longitudinal axes of said parts, said conveyor comprising a pair of laterally spaced sideplates, a series of notches formed in the upper portion of each of said sideplates for supporting and axially spacing said individual cylindrical parts along parallel axes extending transversely to the longitudinal axis of the sideplates, a plurality of carrier members, each of said carrier members supported by said sideplates for pivotal and vertical sliding movement between a pair of axially spaced notches and comprising a ramp portion normally positioned below one of said pair of axially spaced notches and a release member having a normal position with its top surface extending into said other of said axially spaced notches to permit a cylindrical part to contact and depress said release member when said cylindrical part occupies the notch, a pawl portion formed on each of said carrier members, a lifter member supported for vertical movement below said carrier members and having a plurality of tabs formed therewith, each of said tabs cooperating with a pawl portion of each of said carrier members to permit the ramp portion of the latter to be raised to move a cylindrical part of the adjacent notch in response to upward movement of the lifter member when the release member of said each of said carrier members is located in said normal position, said each of said tabs and the cooperating pawl portion adapted to be disengaged when a cylindrical part depresses the release member of said each of said carrier members so that upward movement of the lifter member is ineffective to raise the ramp portion.

FO-1050
(5/69)

UNITED STATES PATENT OFFICE
CERTIFICATE OF CORRECTION

Patent No. 3,592,335  Dated July 13, 1971

Inventor(s) Howard M. Meyer

It is certified that error appears in the above-identified patent and that said Letters Patent are hereby corrected as shown below:

On the front page, the title should read -- Conveyor For Cylindrical Parts --.  Column 1, line 1, the title should read -- Conveyor For Cylindrical Parts --; line 54, "object" should read -- objects --.  Column 2, line 27, after "of" insert -- a --.  Column 3, line 42, "par" should read -- part --.  Column 4, line 70, "of", first occurrence, should read -- to --.

Signed and sealed this 25th day of January 1972.

(SEAL)
Attest:

EDWARD M. FLETCHER, JR.
Attesting Officer

ROBERT GOTTSCHALK
Commissioner of Patents